United States Patent

Toh

(10) Patent No.: US 7,415,108 B2
(45) Date of Patent: Aug. 19, 2008

(54) TILT-LEG-BREAKAGE PREVENTION MECHANISM OF TERMINAL DEVICE

(75) Inventor: Tadamine Toh, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 782 days.

(21) Appl. No.: 10/819,107

(22) Filed: Apr. 7, 2004

(65) Prior Publication Data

US 2004/0202315 A1 Oct. 14, 2004

(30) Foreign Application Priority Data

Apr. 11, 2003 (JP) ............................. 2003-107809

(51) Int. Cl.
*H04M 1/00* (2006.01)

(52) U.S. Cl. ........................ 379/445; 379/454

(58) Field of Classification Search ................ 379/454, 379/445, 455; 248/444, 455, 460
See application file for complete search history.

(56) References Cited

U.S. PATENT DOCUMENTS

| 4,113,212 A | 9/1978 | Coriden |
| 4,856,748 A | 8/1989 | Obermeyer |
| 5,732,928 A | 3/1998 | Chang |
| 5,823,504 A | 10/1998 | Kuwajima |

FOREIGN PATENT DOCUMENTS

| DE | 381 443 C | 9/1923 |
| GB | 2 191 394 A | 12/1987 |
| JP | 60-153675 | 8/1985 |
| JP | 6-030097 | 2/1994 |
| JP | 7-250145 A | 9/1995 |
| JP | 10-23126 A | 1/1998 |
| JP | 10-210124 | 8/1998 |
| JP | 11-307952 | 11/1999 |

*Primary Examiner*—Curtis Kuntz
*Assistant Examiner*—Tuan D Nguyen
(74) *Attorney, Agent, or Firm*—Foley & Lardner LLP

(57) ABSTRACT

A telephone includes an upper casing, a lower casing, and a receiver transmitter. The lower casing has a pair of projecting support sections at one end of the bottom, to which a first leg is rotatably mounted. The first leg includes a rotatable and slidable second leg. In a large-angle inclined state of the telephone, first and second engaging sections of the second leg are in engagement with first and second engaged sections of the first leg, respectively. When an excessive load is applied to the telephone in the direction of the arrow, the engaging sections are elastically deformed, being brought out of engagement with the engaged sections. Accordingly, the second leg tilts onto a desk into parallel with the desk. Consequently, the second leg is subjected to no longitudinal load. Thus, even if the second leg is not strong in structure, the second leg can be prevented from breaking.

7 Claims, 9 Drawing Sheets

TILT-LEG-BREAKAGE PREVENTION MECHANISM OF TERMINAL DEVICE

This application claims priority to prior Japanese application JP 2003-107809, the disclosure of which is incorporated herein by reference.

BACKGROUND OF THE INVENTION

The present invention relates to a mechanism for preventing the breakage of a tilt leg of a terminal device, using a telephone as an application example.

The main points of an installation-angle adjusting mechanism of a device such as a telephone will first be described as a first related art with reference to Japanese Patent Application Publication (JP-A) No. H10-23126.

Referring to FIG. 1, a telephone 31 includes an upper casing 32, a lower casing 33, and a receiver transmitter 34. The upper casing 32 includes a numeric keypad 32a. The lower casing 33 has a first leg 35 rotatably attached to one end of the bottom thereof. The first leg 35 includes a second leg 36 rotatably and slidably attached thereto (the details will be described later). The lower casing 33 has a leg 33a, made of an elastic material such as rubber, attached to the other end of the bottom thereof.

Referring to FIG. 2, a holding section 33b is provided at one end of the bottom of the lower casing 33 for accommodating the first leg 35 and the second leg 36. The holding section 33b has a shaft 33c on side wall 33b1.

FIG. 3 shows a state in which the lower casing 33 is horizontally positioned on a desk 37. The first leg 35 and the second leg 36 are overlaid in the holding section 33b. A leg 35a made of an elastic material such as rubber is attached to one end of the first leg 35. Similarly, a leg 36a is attached to one end of the second leg 36. A leg 36b is attached to the vicinity of the leg 36a in the direction perpendicular to the leg 36a. In this state, the leg 36b is in contact with the desk 37.

FIG. 4 shows a state in which the lower casing 33 is moved onto the desk 37 at a small angle. The first leg 35 rotates approximately at 90 degrees together with the second leg 36 from the holding section 33b in the direction of the arrow around the shaft 33c, and so the leg 35a is brought into contact with the desk 37.

FIG. 5 shows a state in which the lower casing 33 is moved onto the desk 37 at a large angle. The second leg 36 rotates at 180 degrees with respect to the first leg 35 with a shaft-support rotating mechanism (not shown) and then slides in the direction of the arrow with a pin and a guide groove mechanism (not shown), and so the leg 36a is brought into contact with the desk 37.

The main points of an angle adjusting mechanism of a telephone will now be described as a second related art with reference to Japanese Patent Application Publication (JP-A) No. H07-250145.

Referring to FIG. 6 and FIGS. 9 to 11, a telephone 41 includes an upper casing 42, a lower casing 43, and a receiver transmitter 44. The lower casing 43 has a pair of first legs 45 (only one is shown) rotatably attached to one end of the bottom thereof. The first leg 45 has a second leg 46 slidably attached thereto (the details will be described later). The lower casing 43 has a leg 43a attached to the other end of the bottom thereof.

The pair of first legs 45 are joined together with a joint 47. A shaft 48 projects horizontally from the side of each first leg 45. A bearing 49, shown in FIG. 7, is attached to the lower casing 43. The bearing 49 has an inclined surface 49a for the shaft 48 to insert, on the lower inside (upside down in FIG. 7) of the bearing 49. The inclined surface 49a is inclined outward toward the lower end. The bearing 49 has a bearing hole 49b in the center. The shaft 48 of the first leg 45 is pushed into the interior of the bearing 49 through the inclined surface 49a such that it can be inserted in and drawn out from the bearing hole 49b by the elastic deformation of the bearing 49.

The pair of second legs 46 is joined together with a joint 50. Each second leg 46 is supported in the first leg 45 such that it can be inserted therein or protrude therefrom. A guide rib 46a protruding from each second leg 46 is engagement with a guide groove 45a of each first leg 45. The guide rib 46a serves as a guide when the second leg 46 is inserted into or protrudes from the first leg 45. Each first leg 45 has engaging holes 45b and 45c in the upper and lower parts. Each second leg 46 has an engaging protrusion 46b that comes selectively into engagement with the engaging hole 45b or 45c. Referring now to FIG. 8, the engaging protrusion 46b has an inclined surface 46c inclined backward at the lower part. The engaging protrusion 46b can be held in the first leg 45 such that it is inserted therein or protrude therefrom by selectively bringing the engaging protrusion 46b into engagement with the engaging hole 45b or 45c.

The lower casing 43 and the joint 50 have an engaging protrusion 43b and an engaging hole 50a, respectively, in correspondence with each other. The legs 45 and 46 rotate from the position indicated in FIG. 6 to the position along the bottom of the lower casing 43 of the telephone 41, indicated in FIG. 9, around the bearing hole 49b and the shaft 48, with the second leg 46 inserted in the first leg 45. At that time, the engaging hole 50a is forcedly brought into engagement with the engaging protrusion 43b.

The outer surface of the first leg 45, or the surface of the first leg 45 in contact with a desk 51 in the normal state shown in FIG. 9, includes a leg 45d mounted thereto. In this state, the telephone 41 is prevented with the legs 43a and 45d from slipping with respect to the desk 51.

The engaging hole 50a is forcedly brought out of engagement with the engaging protrusion 43b in the normal state of FIG. 9 and, as shown in FIG. 10, the legs 45 and 46 are rotated approximately at 90 degrees in the direction of the arrow from the bottom of the lower casing 43. Then an operating surface 42a of the telephone 41 moves to the position at which the inclination angle relative to the desk 51 is increased by a small angle. In this state, the telephone 41 is prevented with the leg 43a of the lower casing 43 and legs 46d of the second legs 46 from slipping with respect to the desk 51.

When each second leg 46 is drawn downward with respect to the first leg 45 in the small-angle inclined state of FIG. 10, the engaging protrusion 46b is brought out of engagement with the engaging hole 45b and brought into engagement with the engaging hole 45c, from the state shown in FIG. 8. Then, as shown in FIG. 11, the operating surface 42a of the telephone 41 moves to the position at which the inclination angle relative to the desk 51 is increased by a large angle. In this state, the telephone 41 is prevented with the legs 43a and 46d from slipping with respect to the desk 51.

The related-art techniques are capable of three-step (more than four steps by design changes) angle adjustment of terminal devices, with the first leg and the second leg as tilt legs. However, measures are not taken at all to prevent breakage of the tilt legs when an excessive load is applied to the terminal devices.

SUMMARY OF THE INVENTION

Accordingly, it is an object of the present invention to provide a tilt-leg-breakage prevention mechanism of a terminal device in which even if an excessive load is applied to the terminal device, the breakage of the tilt leg can be prevented.

According to the present invention, a tilt-leg-breakage prevention mechanism of a terminal device is provided which includes a tilt leg, the tilt leg including a first leg mounted to the body of the terminal device and a second leg rotatably and slidably mounted to the first leg; wherein a lock mechanism is interposed between the first leg and the second leg; wherein when an excessive load is applied to the body, the lock mechanism is released to prevent the breakage of the second leg; and the lock mechanism is recoverable.

According to the present invention, a tilt-leg-breakage prevention mechanism of a terminal device is provided which includes a tilt leg, the tilt leg being rotatably held in a projecting support section provided to the body of the terminal device.

DESCRIPTION OF THE PREFERRED EMBODIMENT

Referring to FIGS. 12 to 24, a tilt-leg-breakage prevention mechanism of a telephone, according to an embodiment of the present invention, will be described.

Figure 1:
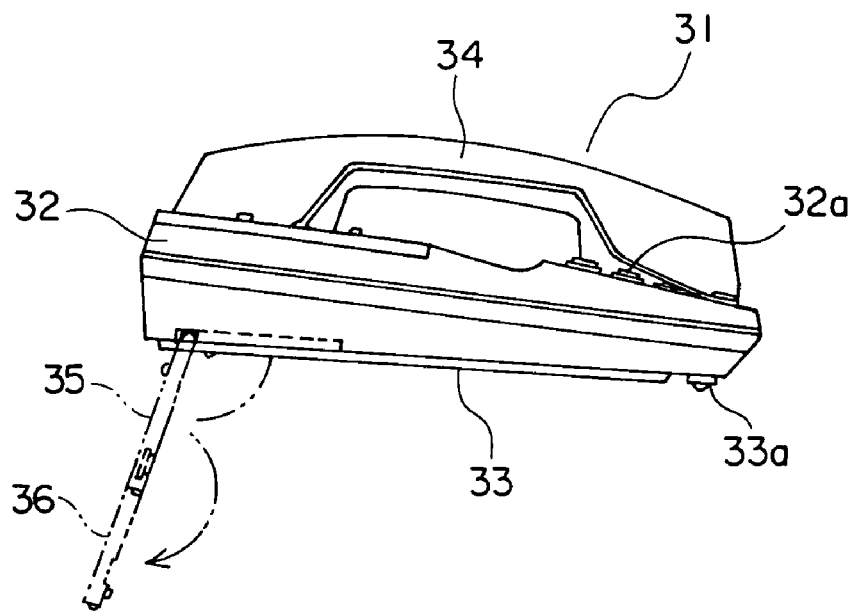
FIG. 1 is a side view of a first related-art telephone.
Figure 2:
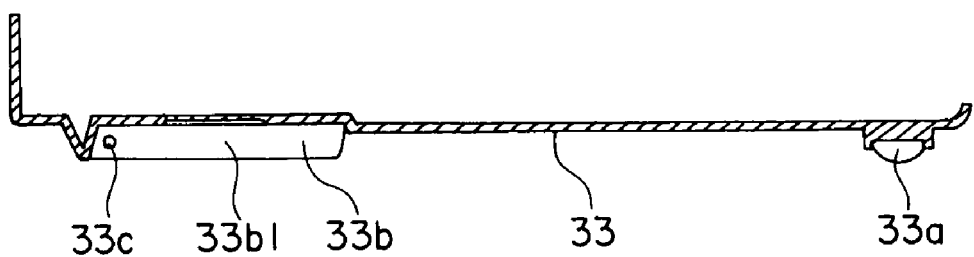
FIG. 2 is a sectional view of a lower casing of the telephone.
Figure 3:
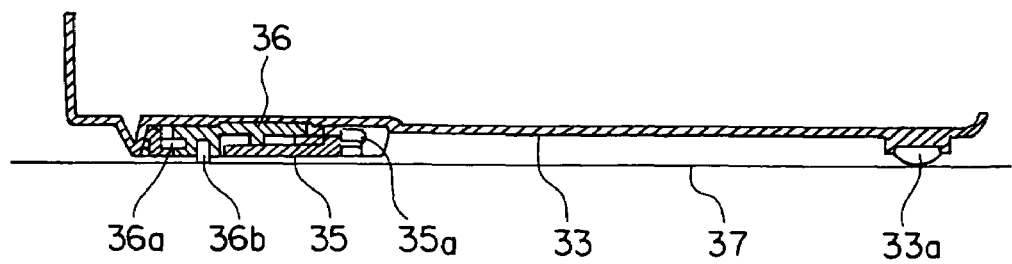
FIG. 3 is a sectional view of the lower casing and a tilt leg of the telephone in a normal state.
Figure 4:
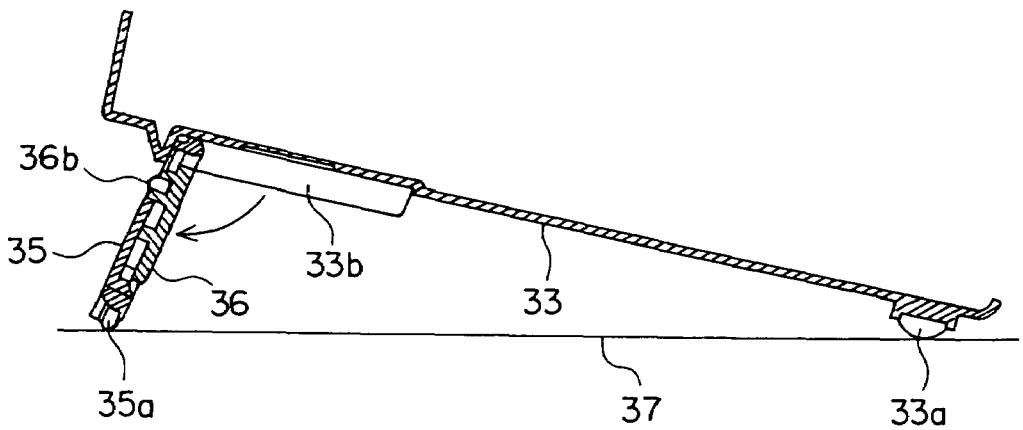
FIG. 4 is a sectional view of the lower casing and the tilt leg of the telephone in a small-angle inclined state.
Figure 5:
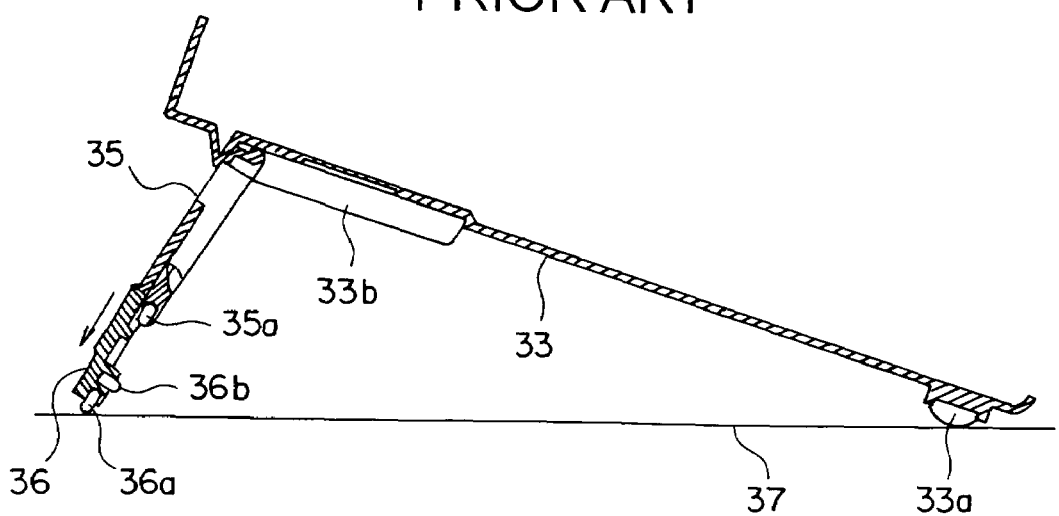
FIG. 5 is a sectional view of the lower casing and the tilt leg of the telephone in a large-angle inclined state.
Figure 6:
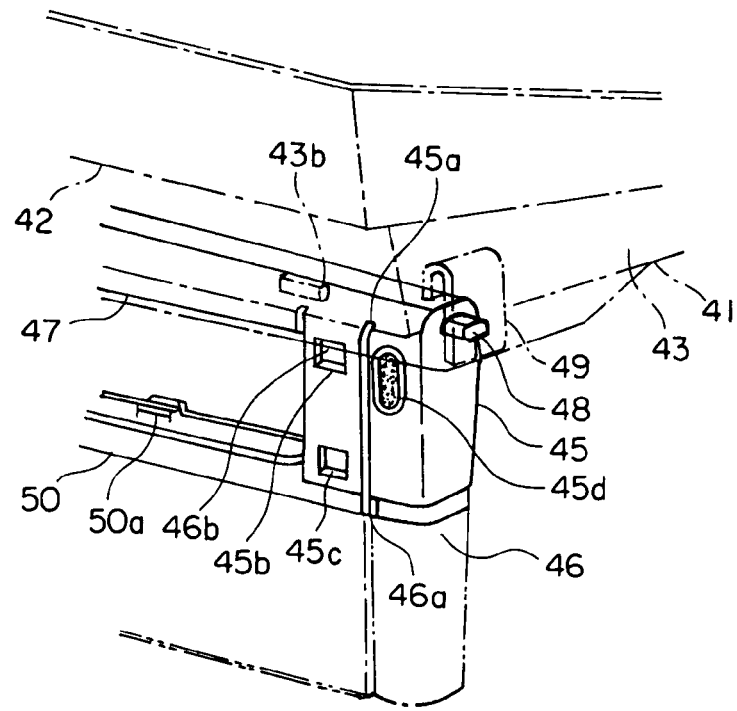
FIG. 6 is a perspective view of an essential part of a second related-art telephone.
Figure 7:
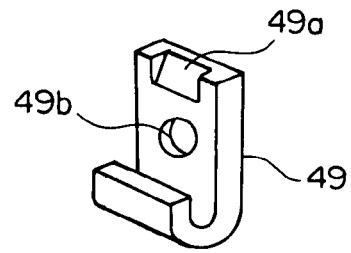
FIG. 7 is a perspective view of a bearing of a tilt leg of the telephone.
Figure 8:
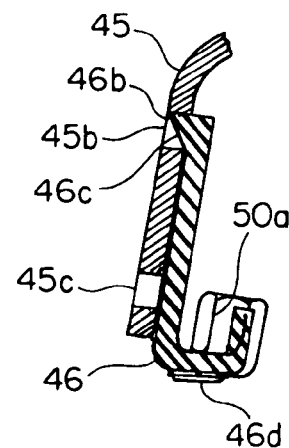
FIG. 8 is a sectional view of the engaging structure of a first leg and a second leg constructing the tilt leg of the telephone.
Figure 9:
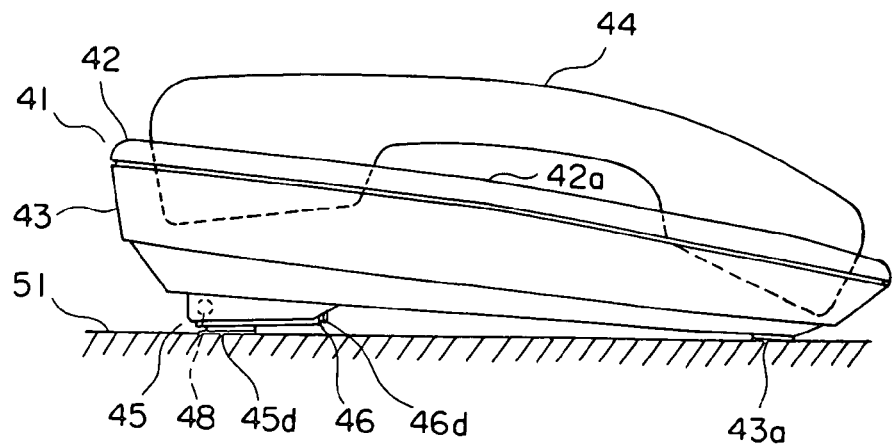
FIG. 9 is a side view of the telephone in a normal state.
Figure 10:
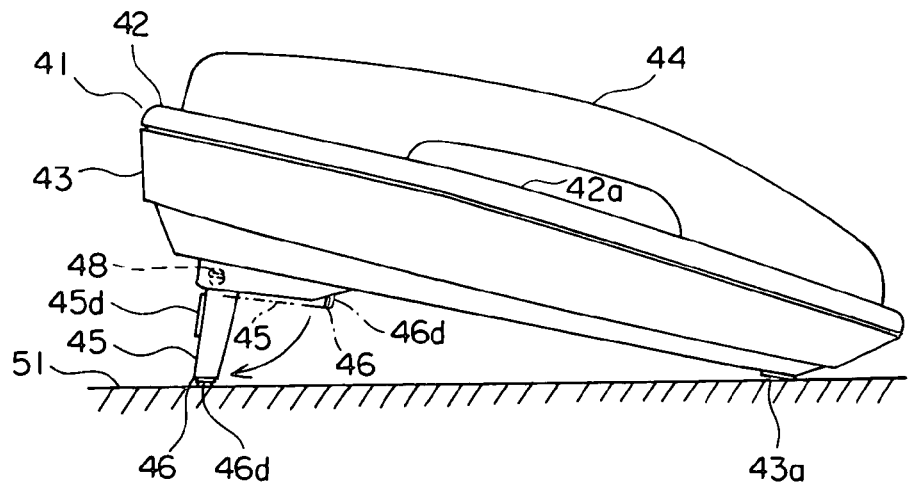
FIG. 10 is a side view of the telephone in a small-angle inclined state.
Figure 11:
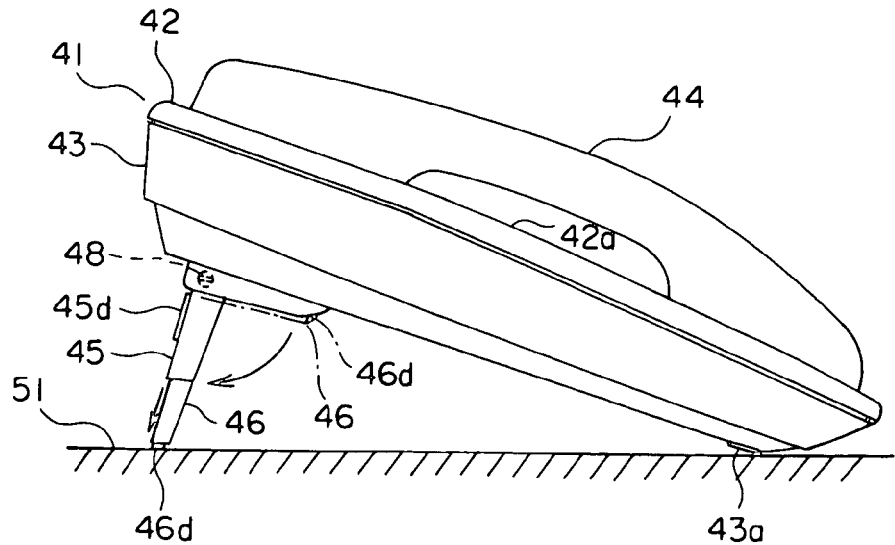
FIG. 11 is a side view of the telephone in a large-angle inclined state.
Figure 12:
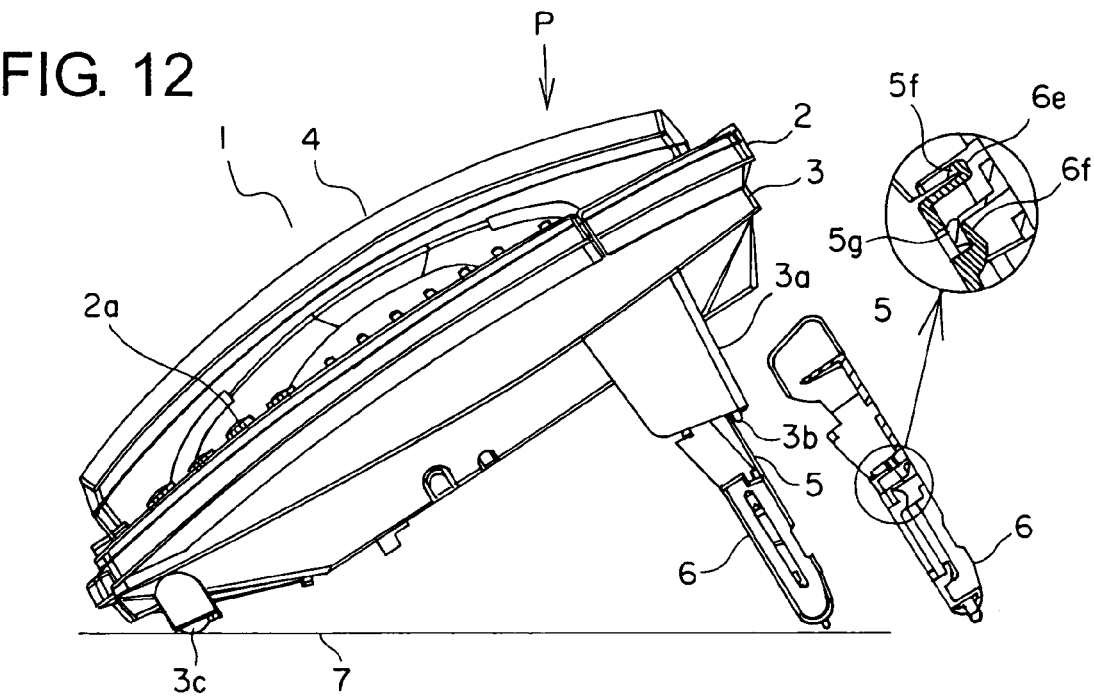
FIG. 12 includes a side view of a telephone according to one embodiment of the present invention, which is set in a large-angle inclined state, a sectional view of a tilt leg, and an enlarged sectional view of a tilt-leg lock mechanism.
Figure 13:
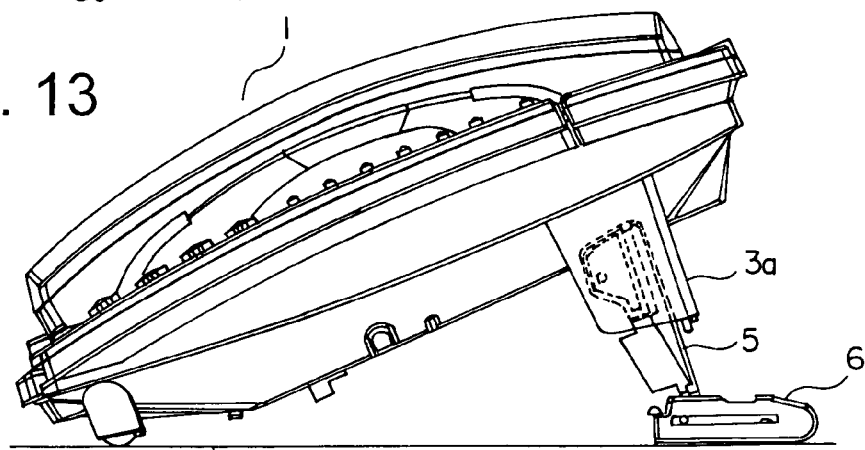
FIG. 13 is a side view of the telephone, showing a state in which the tilt-leg lock mechanism is released.
Figure 20:
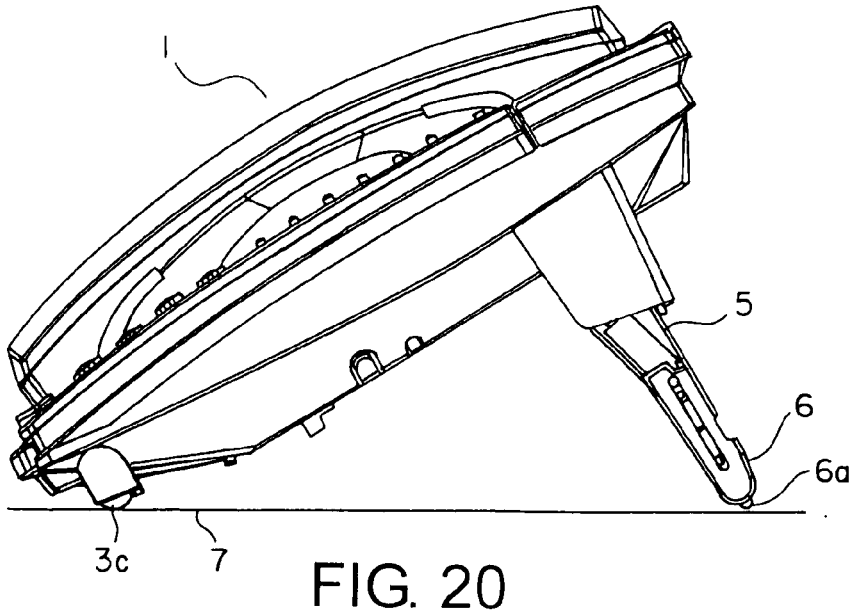
FIG. 20 is a side view of the telephone in a large-angle inclined state.
Figure 21:
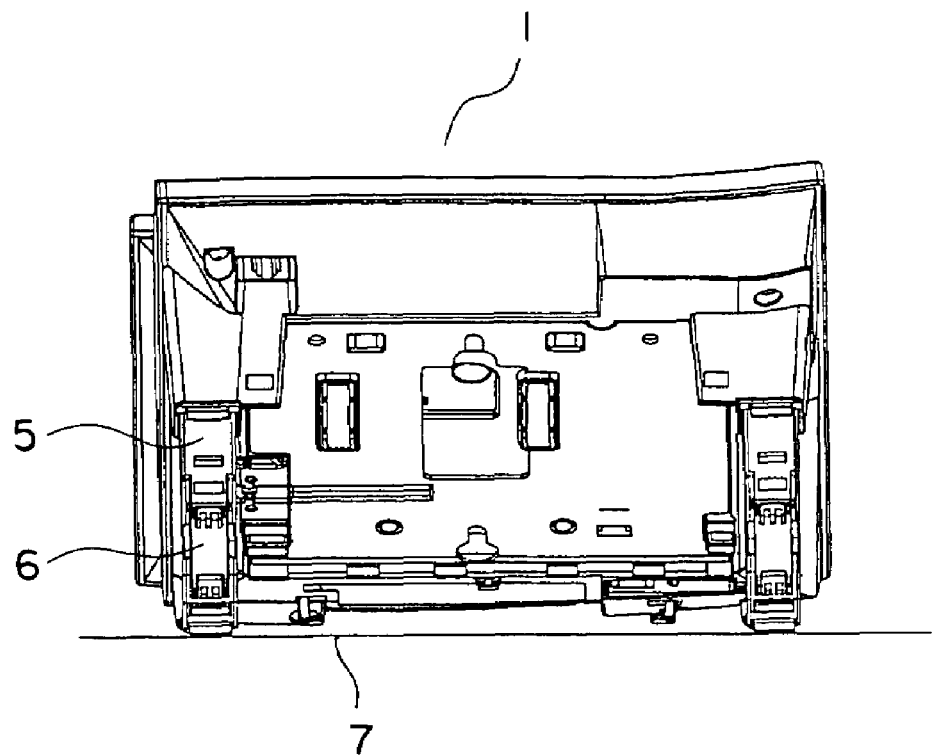
FIG. 21 is a back view of the telephone in the large-angle inclined state.
Figure 22:
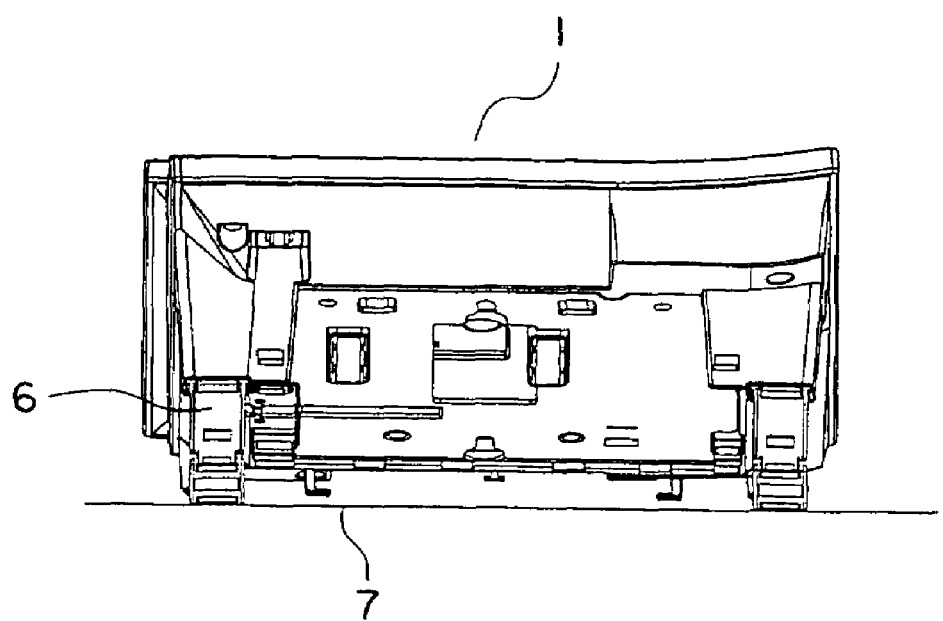
FIG. 22 is a back view of the telephone in the small-angle inclined state.

FIG. 12 shows a telephone 1 placed on a desk 7 at a large angle (refer to FIG. 20). The telephone 1 includes an upper casing 2, a lower casing 3, and a receiver transmitter 4. The upper casing 2 includes a numeric keypad 2a. The lower casing 3 has a first leg 5 rotatably mounted to each of projecting support sections 3a provided in the vicinity of opposite corners at one end of the bottom of the lower casing 3. The first leg 5 includes a second leg 6 rotatably and slidably attached thereto (the details will be described later). The projecting support section 3a has a leg 3b at the end, which is made of an elastic material such as rubber, for preventing slipping. Also the lower casing 3 has legs 3c attached to opposite corners at the other end of the bottom thereof.

The lower casing 3, the first leg 5, and the second leg 6 are made of synthetic resin, whose related structures will be described with reference to FIGS. 12 to 20.

Figure 15:
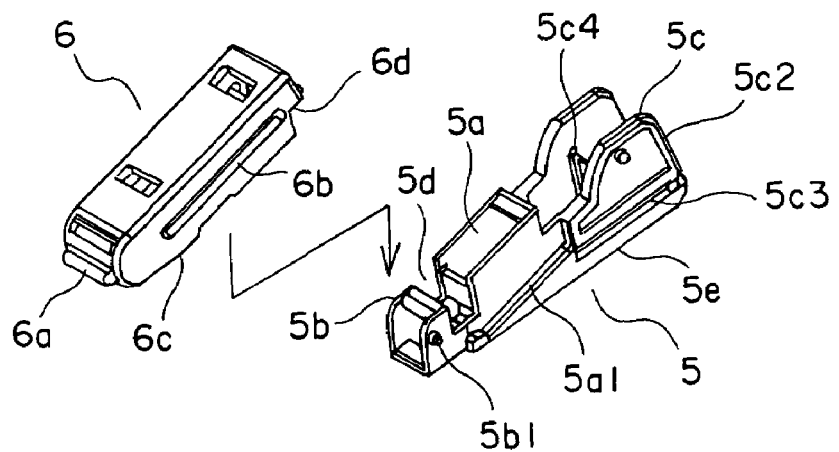
FIG. 15 is a perspective view of the second leg before it is accommodated in the first leg.
Figure 16:
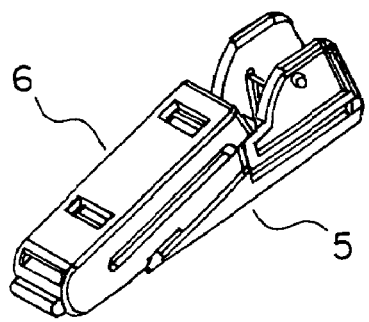
FIG. 16 is a perspective view of the second leg accommodated in the first leg.
Figure 17:
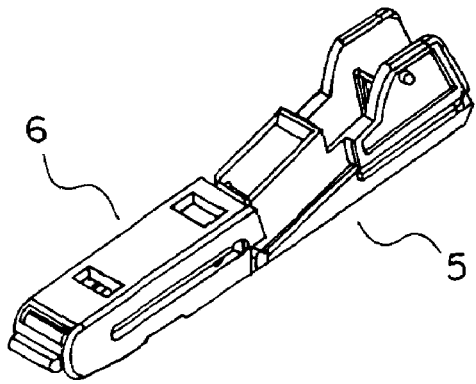
FIG. 17 is a perspective view of the second leg drawn from the first leg.

Referring to FIGS. 15 to 17, the first leg 5 includes a first mounting section 5a for the second leg 6 in the center, a second mounting section 5b at one end, and a pair of upstanding plates 5c at the other end. The first mounting section 5a includes guides 5a1 at the opposite sides thereof. The second mounting section 5b includes guide pins 5b1 on the opposite sides thereof. Between the first mounting section 5a and the second mounting section 5b, a recess 5d is provided. The upstanding plates 5c have guide grooves 5c3 corresponding to a pair of projecting shafts (not shown) provided in the projecting support section 3a to rotatably mount the first leg 5 to the projecting support section 3a. Since the lower surface 5e of the first leg 5 and the end faces 5c2 of the upstanding plates 5c are in contact with the inner surface of the projecting support section 3a in the position of FIG. 13, the first leg 5 is prevented from rotating leftward around the pair of projecting shaft in the projecting support sections 3a.

The second leg 6 has a leg 6a at the end and guide grooves 6b in opposite sides.

The method for joining the second leg 6 to the first leg 5 will now be described. Referring to FIG. 15, each guide groove 6b is fitted on the guide pin 5b1 to mount the second leg 6 on the first mounting section 5a and the second mounting section 5b of the first leg 5 into the held state shown in FIG. 16. When the second leg 6 is then drawn from the first leg 5, the guide grooves 6b are guided by the guide pins 5b1 and the opposite sides of the lower surface 6c of the second leg 6 slide on the guides 5a1 into the projecting state shown in FIG. 17. In the projecting state, the rear end 6d of the second leg 6 is in engagement with the recess 5d of the first leg 5.

Figure 23:
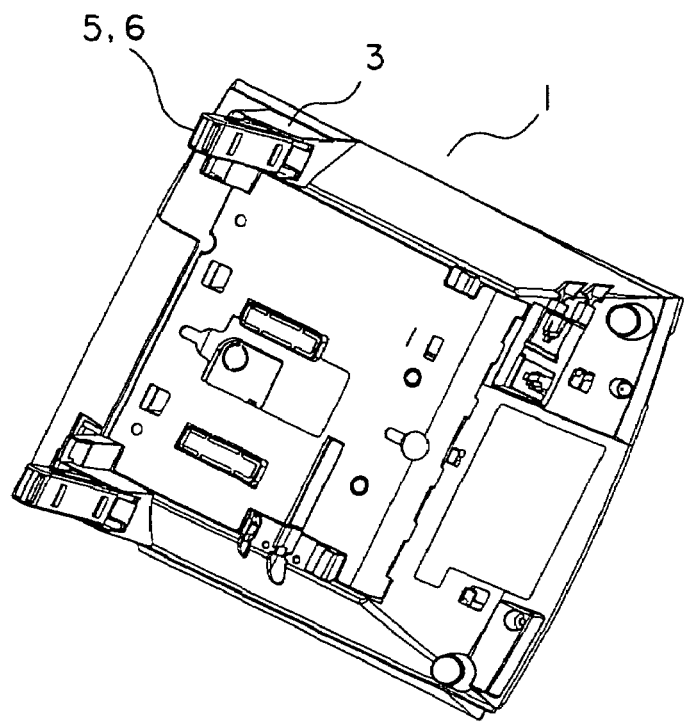
FIG. 23 is a perspective view of the telephone in which the tilt legs are mounted to projection support sections of the telephone, viewed from the lower surface of the telephone.
Figure 24:
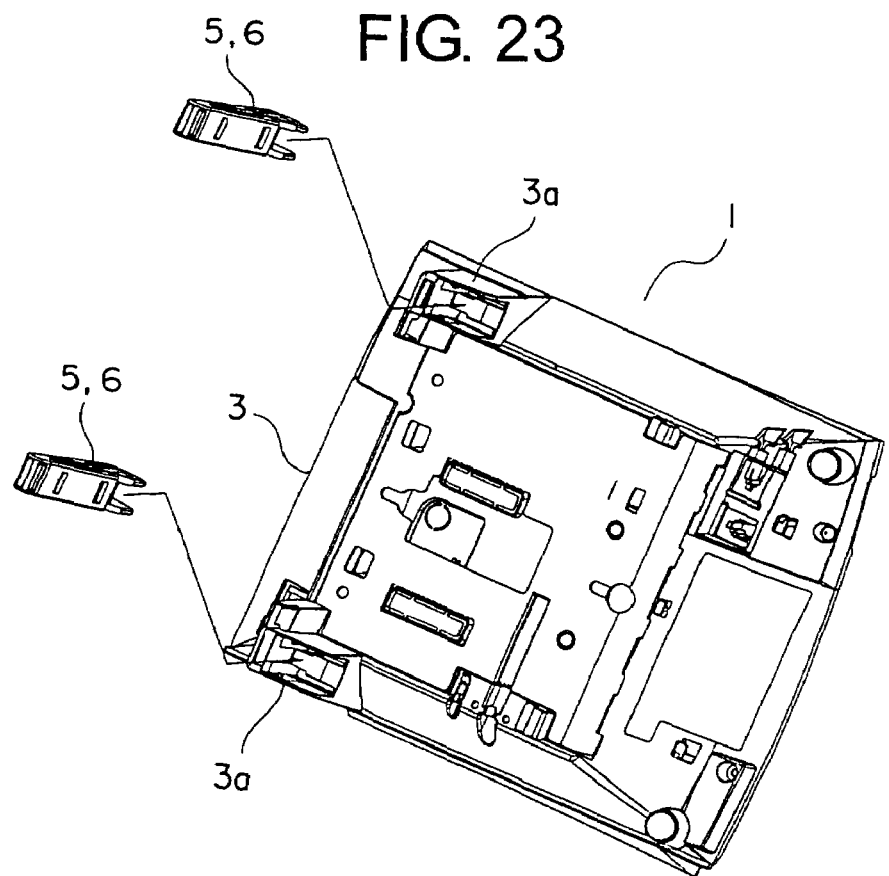
FIG. 24 is a perspective view of the telephone before the tilt legs are mounted to the projection support sections of the telephone, viewed from the lower surface of the telephone.

When the pair of joined first leg 5 and the second leg 6 is mounted in each projecting support section 3a of the lower casing 3 shown in FIG. 24, the telephone 1 is completed, as shown in FIG. 23.

Figure 18:
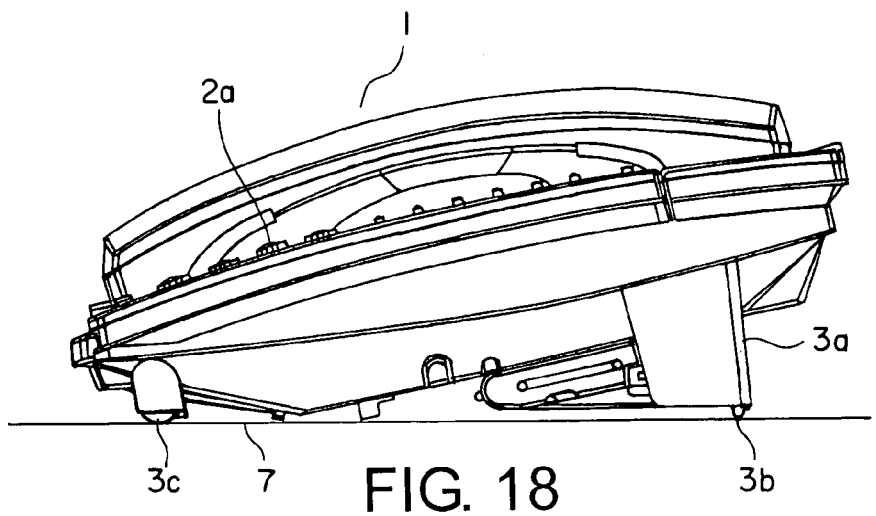
FIG. 18 is a side view of the telephone in a normal-angle inclined state.

The method for adjusting the inclination angle of the telephone 1 in three steps will be described. Referring to FIG. 18, the surface of the telephone 1 including the numeric keypad 2a is set in a normal-angle inclined state at which it is inclined at 12.5 degrees to the desk 7 such that each first leg 5 and each second leg 6 are rotated around the pair of projecting shafts in the projecting support section 3a on which the guide grooves 5c3 of the first leg 5 are fitted, thereby bringing them to the position parallel to the bottom of the lower casing 3. In this normal-angle inclined state, the legs 3b and 3c of the telephone 1 are in contact with the desk 7.

Figure 19:
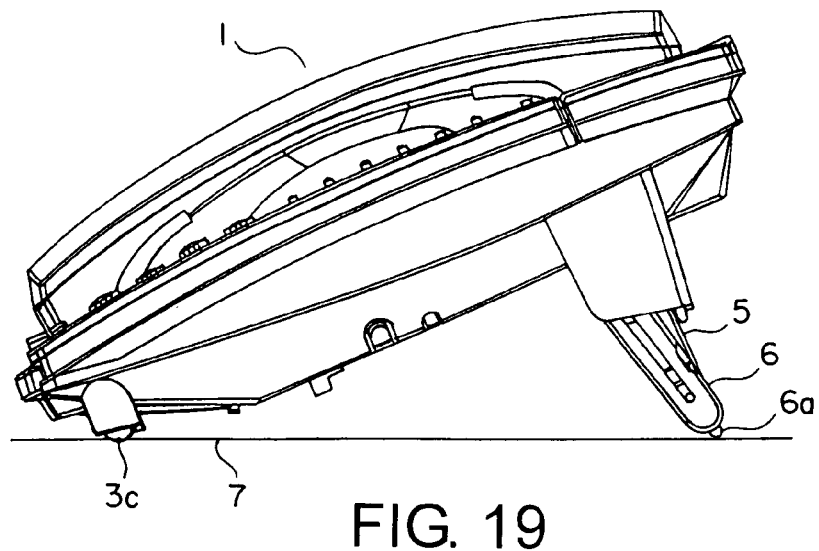
FIG. 19 is a side view of the telephone in a small-angle inclined state.

Referring now to FIG. 19, the surface of the telephone 1 including the numeric keypad 2a is set in a small-angle inclined state at which it is inclined at 25 degrees to the desk 7 such that each first leg 5 and each second leg 6 are rotated leftward to the utmost limit from the position of FIG. 18 around the pair of projecting shafts in the projecting support section 3a on which the guide grooves 5c3 of the first leg 5 are fitted, thereby inserting the upstanding plates 5c into upstanding-plate-5c through holes (not shown) provided in the projecting support section 3a until a contact section 5c4 comes to the end. In this small-angle inclined state, the legs 3c of the telephone 1 and the legs 6a of the second legs 6 are in contact with the desk 7.

Referring to FIG. 20, the surface of the telephone 1 including the numeric keypad 2a is set in a large-angle inclined state at which it is inclined at 32.5 degrees to the desk 7 such that each second leg 6 is drawn from each first leg 5, as shown in FIG. 17. In this large-angle inclined state, the legs 3c of the telephone 1 and the legs 6a of the second legs 6 are in contact with the desk 7.

Figure 14:
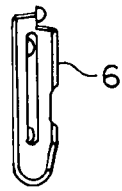
FIG. 14 includes side views of a first leg and a second leg constructing the tile leg of the telephone.

Referring to FIGS. 12 and 14, the locking mechanism of the first leg 5 and the second leg 6 will now be described. The second leg 6 includes a first engaging section 6e and a second engaging section 6f which are bent in substantially L-shape in cross section. The engaging sections 6e and 6f are elastically deformable. The first leg 5 includes a first engaged section 5f and a second engaged section 5g which are shaped like a step. In the state of FIG. 12, or in a large-angle inclined state of FIG. 20, the first engaging section 6e is in engagement with the first engaged section 5f and the second engaging section 6f is in engagement with the second engaged section 5g.

When a load P is applied to the telephone 1 in the direction of the arrow, the telephone 1 maintains the state of FIG. 12 when the load P is, for example, approximately less than 20 kgf. When the load P is approximately 20 kgf or more, the locking mechanism of the first leg 5 and the second leg 6 is released to shift the telephone 1 to the state of FIG. 13. More specifically, since the engaging sections 6e and 6f are elastically deformed, they are brought out of engagement with the engaged sections 5f and 5g to tilt the second leg 6 onto the desk 7 in parallel therewith. Consequently, the second leg 6 is subjected to no longitudinal load. In this state, the guide pins 5b1 of the first leg 5 are positioned in the guide grooves 6b of the second leg 6. Accordingly, the positional relationship between the first leg 5 and the second leg 6 can be easily and rapidly restored to the state of FIG. 12. Thus, even if the structural strength of the second leg 6 is low, the breakage of the second leg 6 can be prevented.

The design can be changed such that the engaging sections 6e and 6f are provided to the first leg 5 and the engaged sections 5f and 5g are provided to the second leg 6, respectively. The engaged sections 5f and 5g may be changed to be elastically deformable.

According to this embodiment, in the state of FIG. 19, the first leg 5 is inserted such that the upstanding plates 5c are inserted into the upstanding-plate-5c through holes (not shown) provided in the projecting support section 3a until the contact section 5c4 comes to the end. In the state of FIG. 19, the first leg 5 is inserted in the projecting support section 3a of the lower casing 3 such that the lower surface 5e, the end faces 5c2, and the opposite sides of the first leg 5 are in contact with the inner surface of the projecting support section 3a. In other words, the first leg 5 is surrounded by the four surfaces of the projecting support section 3a. Thus, for example, even if an adult man (approximately 60 kgf of load P in FIG. 12) gets on the telephone 1 erroneously in the state of FIG. 19, the breakage of the first legs 5 can be prevented.

According to the embodiment, even when the tilt leg includes only the first leg 5 but not the second leg 6, the invention can be constructed.

As is apparent from the above description, the invention offers the following advantages:

1. Even if an excessive load is applied to the body of a terminal device, the locking mechanism is released to prevent the breakage of the second leg and the locking mechanism can immediately be restored.

2. Since the tilt leg (first leg) is rotatably held in the projecting support section provided to the body of the terminal device, it is strong in structure.

3. Since the breakage prevention mechanism has a simple structure, it can easily be manufactured, is convenient to assemble and explode, and requires low cost.

Although the present invention has been shown and described in conjunction with the preferred embodiment thereof, it will readily be understood by those skilled in the art that the present invention is not limited to the foregoing description but may be changed and modified in various other manners without departing from the spirit and scope of the present invention as set forth in the appended claims.

What is claimed is:

1. A tilt-leg-breakage prevention mechanism of a terminal device, comprising:
    a tilt leg, the tilt leg including a first leg mounted to a body of the terminal device and a second leg configured to rotatably and slidably mount to the first leg, wherein the first leg and the second leg are configured for placement in a projecting state such that at least a portion of the terminal device is elevated; and
    a lock mechanism interposed between the first leg and the second leg, wherein when a specified load or more is applied to the body, the lock mechanism is configured to release such that the first leg and the second leg enter a collapsed state to prevent breakage of the second leg, and further wherein the lock mechanism is configured to restore the first leg and the second leg into the projecting state.

2. A tilt-leg-breakage prevention mechanism according to claim 1, wherein the lock mechanism comprises an engaging section attached to at least one of the first leg and the second leg and an engaged section attached to at least one of the first leg and the second leg, wherein at least one of the the engaging section and the engaged section are elastically deformable.

3. A tilt-leg-breakage prevention mechanism according to claim 1, wherein the first leg is rotatably mounted to a projecting support section of the body.

4. A tilt-leg-breakage prevention mechanism according to claim 1, wherein a pair of guide grooves provided in the second leg is fitted on a pair of guide pins provided on the first leg.

5. A tilt-leg-breakage prevention mechanism according to claim 4, wherein the second leg is guided by a pair of guides provided at the first leg.

6. A tilt-leg-breakage prevention mechanism according to claim 1, wherein the second leg is mounted to a first mounting section and a second mounting section provided at the first leg, so that the second leg is held in the first leg.

7. A tilt-leg-breakage prevention mechanism according to claim 6, wherein when the second leg is drawn from the first leg, one end of the second leg is brought into engagement with a recess provided between the first mounting section and the second mounting section.

* * * * *